US009477775B2

(12) United States Patent
Makela (10) Patent No.: US 9,477,775 B2
(45) Date of Patent: Oct. 25, 2016

(54) SYSTEM AND METHOD FOR MAINTAINING A VIEW LOCATION DURING RENDERING OF A PAGE

(75) Inventor: Mikko K. Makela, Tampere (FI)

(73) Assignee: Nokia Technologies Oy, Espoo (FI)

( * ) Notice: Subject to any disclaimer, the term of this patent is extended or adjusted under 35 U.S.C. 154(b) by 1157 days.

(21) Appl. No.: 11/145,412

(22) Filed: Jun. 3, 2005

(65) Prior Publication Data

US 2006/0274083 A1 Dec. 7, 2006

(51) Int. Cl.
*G06F 3/048* (2013.01)
*G06F 17/30* (2006.01)
*H04L 29/08* (2006.01)

(52) U.S. Cl.
CPC ......... *G06F 17/30905* (2013.01); *H04L 67/02* (2013.01); *H04L 67/10* (2013.01)

(58) Field of Classification Search
USPC .......................... 715/784, 781, 530; 345/613
See application file for complete search history.

(56) References Cited

U.S. PATENT DOCUMENTS

| | | | | |
|---|---|---|---|---|
| 5,754,766 A * | 5/1998 | Shaw et al. | | 709/200 |
| 5,778,372 A * | 7/1998 | Cordell | | G06F 17/30902 |
| 5,845,084 A * | 12/1998 | Cordell | | G06Q 30/02 |
| | | | | 709/232 |
| 5,917,475 A * | 6/1999 | Kuzunuki et al. | | 345/173 |
| 6,148,294 A * | 11/2000 | Beyda et al. | | |
| 6,337,697 B1 * | 1/2002 | Kim | | 715/784 |
| 6,476,796 B1 * | 11/2002 | Kuzunuki et al. | | 345/173 |
| 6,486,895 B1 * | 11/2002 | Robertson | | G06F 3/0483 |
| | | | | 707/E17.111 |
| 6,950,991 B2 * | 9/2005 | Bloomfield et al. | | 715/738 |
| 7,168,038 B2 * | 1/2007 | Lui et al. | | 715/530 |
| 7,193,609 B2 * | 3/2007 | Lira | | 345/157 |
| 7,222,306 B2 * | 5/2007 | Kaasila et al. | | 715/801 |
| 7,287,220 B2 * | 10/2007 | Kaasila et al. | | 715/201 |
| 7,360,169 B2 * | 4/2008 | Duperrouzel et al. | | 715/788 |
| 7,439,937 B2 * | 10/2008 | Ben-Shachar et al. | | 345/1.1 |
| 7,533,144 B2 * | 5/2009 | Kassab | | G06F 17/30893 |
| | | | | 707/E17.116 |
| 7,581,174 B2 * | 8/2009 | Makela | | 715/238 |
| 7,921,365 B2 * | 4/2011 | Sauve et al. | | 715/738 |
| 2002/0015057 A1 * | 2/2002 | Park | | G06F 17/30861 |
| | | | | 715/738 |
| 2002/0083098 A1 * | 6/2002 | Nakamura | | G06F 17/30873 |
| | | | | 715/234 |
| 2003/0095135 A1 * | 5/2003 | Kaasila et al. | | 345/613 |
| 2003/0128234 A1 * | 7/2003 | Brown | | G06F 3/14 |
| | | | | 715/744 |
| 2003/0137522 A1 * | 7/2003 | Kaasila et al. | | 345/619 |
| 2004/0039996 A1 * | 2/2004 | Flam | | 715/536 |

(Continued)

FOREIGN PATENT DOCUMENTS

EP    0632362    1/1995

OTHER PUBLICATIONS

International Search Report for Application PCT/IB2006/001455.

(Continued)

*Primary Examiner* — Jeffrey A Gaffin
*Assistant Examiner* — Justin Lee
(74) *Attorney, Agent, or Firm* — Alston & Bird LLP (57) ABSTRACT

An improved system and method for maintaining a view location during the rendering of content on a display of an electronic device. When a user views a web page or similar content while the content is in the process of being loaded onto the display of the electronic device, a reference point is selected corresponding to a portion of the web page that appears on the display. As additional material is downloaded, it is added to the web page. If the new material is located on a portion of the web page before the reference point, then the portion of the web page that appears on the display is substantially maintained.

19 Claims, 5 Drawing Sheets

(56) References Cited

U.S. PATENT DOCUMENTS

| | | | |
|---|---|---|---|
| 2004/0060008 A1* | 3/2004 | Marshall | G06F 17/3089 715/205 |
| 2004/0105127 A1* | 6/2004 | Cudd et al. | 358/1.18 |
| 2004/0111705 A1* | 6/2004 | Motoyama et al. | 717/126 |
| 2004/0177323 A1* | 9/2004 | Kaasila et al. | 715/513 |
| 2005/0041858 A1* | 2/2005 | Celi et al. | 382/173 |
| 2005/0086597 A1* | 4/2005 | Duperrouzel et al. | 715/526 |
| 2005/0235220 A1* | 10/2005 | Duperrouzel et al. | 715/788 |
| 2006/0064647 A1* | 3/2006 | Tapuska | G06F 17/30905 715/800 |
| 2006/0136839 A1 | 6/2006 | Makela | |
| 2006/0274083 A1* | 12/2006 | Makela | 345/619 |
| 2007/0008338 A1* | 1/2007 | Kim | 345/629 |
| 2008/0005695 A1* | 1/2008 | Ozzie et al. | 715/811 |
| 2008/0086700 A1* | 4/2008 | Rodriguez et al. | 715/804 |

OTHER PUBLICATIONS

Supplementary European Search Report for EPO Application No. 06 76 5447.
International Preliminary Report on Patentability/Written Opinion for Application No. PCT/IB2006/001455 dated Dec. 6, 2007.

* cited by examiner

SYSTEM AND METHOD FOR MAINTAINING A VIEW LOCATION DURING RENDERING OF A PAGE

FIELD OF THE INVENTION

The present invention relates generally to the viewing and navigation of digital visual content. More particularly, the present invention relates to the viewing and navigation of digital visual content as the digital visual content is in the process of being loaded for viewing on a display screen.

BACKGROUND OF THE INVENTION

Over the past decade, the Internet has become a larger and larger part of people's daily lives. Individuals now use the Internet for activities ranging from consumer shopping to business management to general leisure activities. In performing these activities, individuals use a variety of different web browsers to display information from remote sites.

Currently, when a user accesses a remote web page using a web browser, the web browser begins to display the web page before all of the page's content has loaded by the user's device. For example, the web browser may display some text before associated graphics have arrived. However, this creates an issue in correctly displaying the entire web page while the loading process is in process. If, during the loading process, a user scrolls the view into the middle of a web page that is still being downloaded, the viewed location will have a tendency to "jump" during the loading process when additional material is downloaded above or before the view location. For example, if a large image whose size is not set in the HTML or XML mark-up arrives at the user's device for display near the upper left corner of the page while the user is viewing text at the center of the page, the locations of already-rendered page elements are forced to change. In a worst case scenario, the material that the user is reading will literally be forced off of the display by the newly loaded material.

In the case of desktop computers and similar devices, the browsing issue discussed above may not be particularly problematic because the displays on such devices are large. Furthermore, when a device has a broadband, ISDN, or similar high-speed connection, the document layout will quickly "freeze" due to the web page being loaded very quickly. However, mobile electronic devices, less efficient computers, and computers using a modem connection do not typically possess these benefits. The displays on such devices are usually quite small, and the connection speed is relatively slow. Furthermore, the processors on such devices are often not nearly as powerful as those on desktop and laptop computers. As a result of all of these factors, the relatively long period of time required to obtain all of the images on a page results in significant jumping of the view, and this jumping can occur for a relatively long period of time after the first page content is initially displayed.

SUMMARY OF THE INVENTION

The present invention provides for an improved system and method of displaying web pages and similar content while the content is being loaded. During the rendering/downloading process, the "view" location of the page on a device's display is maintained based upon the content actually appearing on the display, instead of being based on the page origin itself. For example, the point according to which the view location is maintained is the part of the page that is shown in the upper left corner of the display. In this way, if the page layout above or before the view location changes as a result of the loading process, the user's view would remain as it was. The present invention can be implemented in conjunction with both two-dimensional and three-dimensional content.

The present invention provides important benefits over conventional systems. With the rapid development of mobile devices that are capable of accessing web pages, more and more users are faced with the issue of having the web page view jump during loading. The present invention alleviates or eliminates this issue. This issue can also be alleviated or eliminated in larger devices, such as desktop computers.

These and other objects, advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF THE INVENTION

Figure 1:
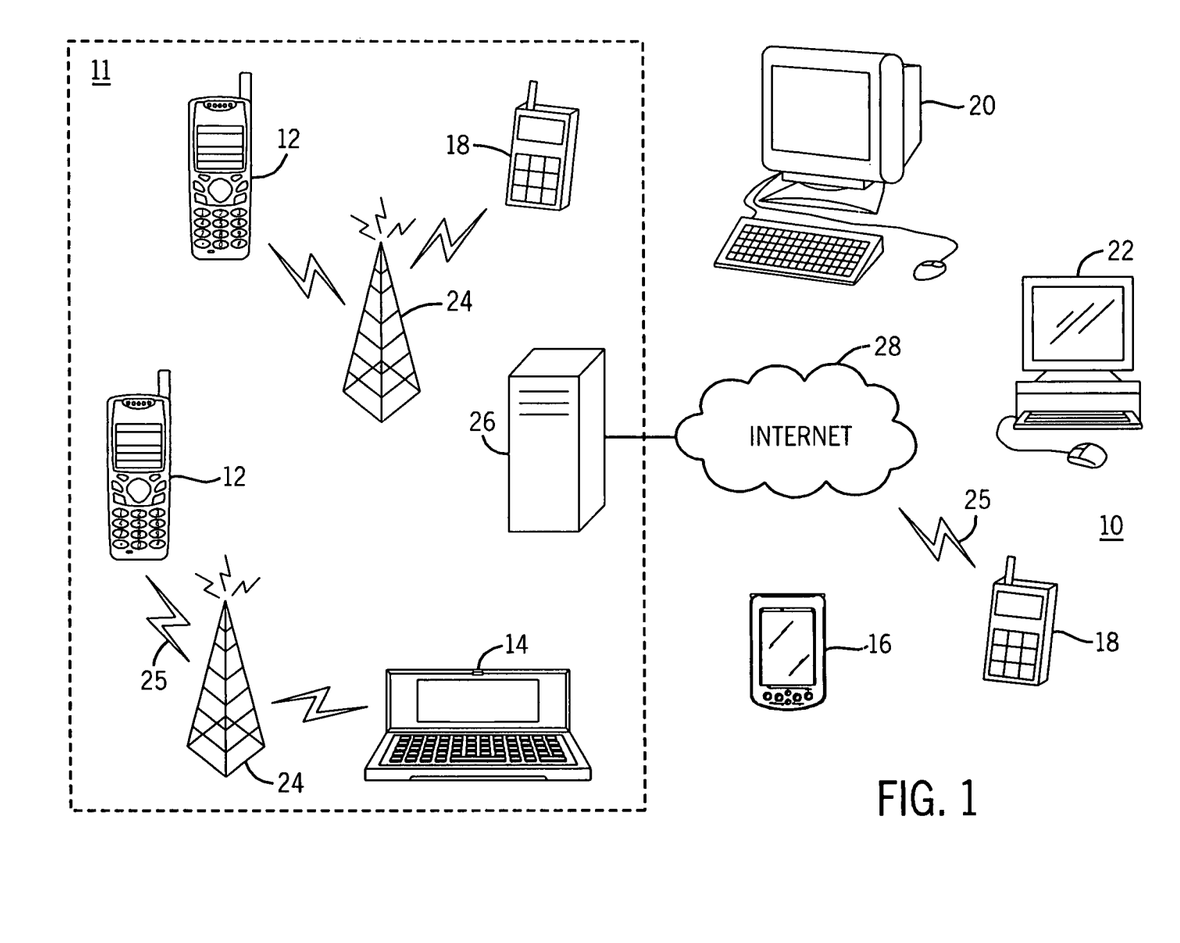
FIG. 1 is an overview diagram of a system within which the present invention may be implemented.

FIG. 1 shows a system 10 in which the present invention can be utilized, comprising multiple communication devices that can communicate through a network. The system 10 may comprise any combination of wired or wireless networks including, but not limited to, a mobile telephone network, a wireless Local Area Network (LAN), a Bluetooth personal area network, an Ethernet LAN, a token ring LAN, a wide area network, the Internet, etc. The system 10 may include both wired and wireless communication devices.

For exemplification, the system 10 shown in FIG. 1 includes a mobile telephone network 11 and the Internet 28. Connectivity to the Internet 28 may include, but is not limited to, long range wireless connections, short range wireless connections, and various wired connections including, but not limited to, telephone lines, cable lines, power lines, and the like.

The exemplary communication devices of the system 10 may include, but are not limited to, a mobile telephone 12, a combination PDA and mobile telephone 14, a PDA 16, an integrated messaging device (IMD) 18, a desktop computer 20, and a notebook computer 22. The communication devices may be stationary or mobile as when carried by an individual who is moving. The communication devices may also be located in a mode of transportation including, but not limited to, an automobile, a truck, a taxi, a bus, a boat, an airplane, a bicycle, a motorcycle, etc. Some or all of the communication devices may send and receive calls and messages and communicate with service providers through a wireless connection 25 to a base station 24. The base station 24 may be connected to a network server 26 that allows communication between the mobile telephone network 11 and the Internet 28. The system 10 may include additional communication devices and communication devices of different types.

The communication devices may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device may communicate using various media including, but not limited to, radio, infrared, laser, cable connection, and the like.

Figure 2:
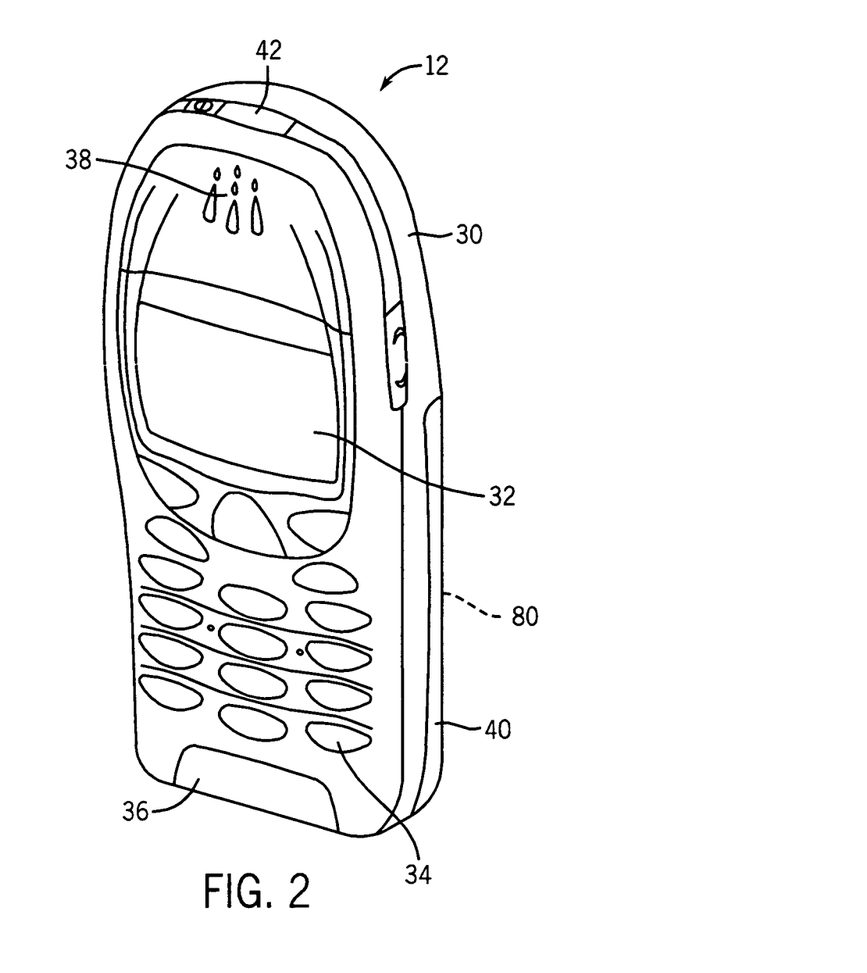
FIG. 2 is a perspective view of a mobile telephone that can be used in the implementation of the present invention.
Figure 3:
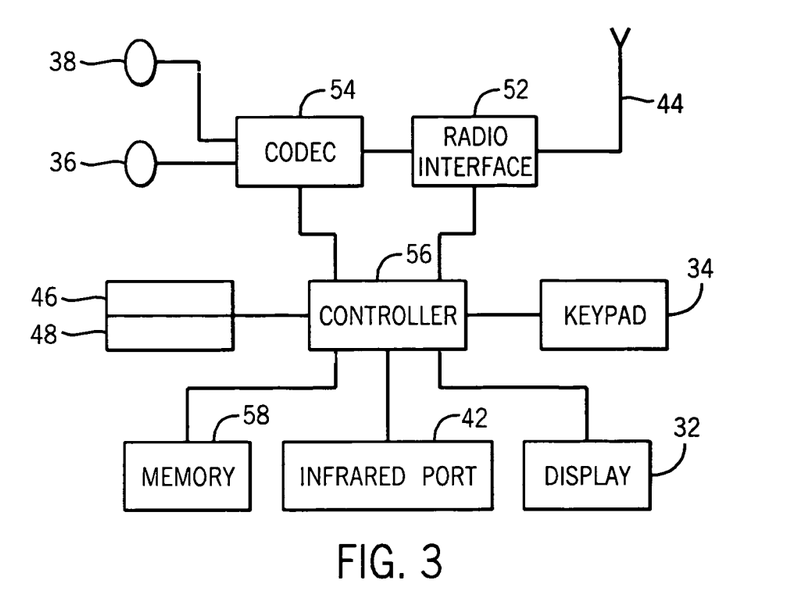
FIG. 3 is a schematic representation of the telephone circuitry of the mobile telephone of FIG. 2.

FIGS. 2 and 3 show one representative mobile telephone 12 within which the present invention may be implemented. It should be understood, however, that the present invention is not intended to be limited to one particular type of mobile telephone 12 or other electronic device. The mobile telephone 12 of FIGS. 2 and 3 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment of the invention, a card reader 48, radio interface circuitry 52, codec circuitry 54, a controller 56 and a memory 58. Individual circuits and elements are all of a type well known in the art, for example in the Nokia range of mobile telephones.

The present invention involves an improved system and method for rendering/downloading a web page or similar content, wherein the portion of the page that is viewed by the user, referred to herein as the view location, is maintained in a constant position according to the content that appears on the user's display, as opposed to the overall content of the page or content being downloaded. This content can be stored locally in the memory 58, or it can be downloaded via wired or wireless communication from other devices.

Figure 4:
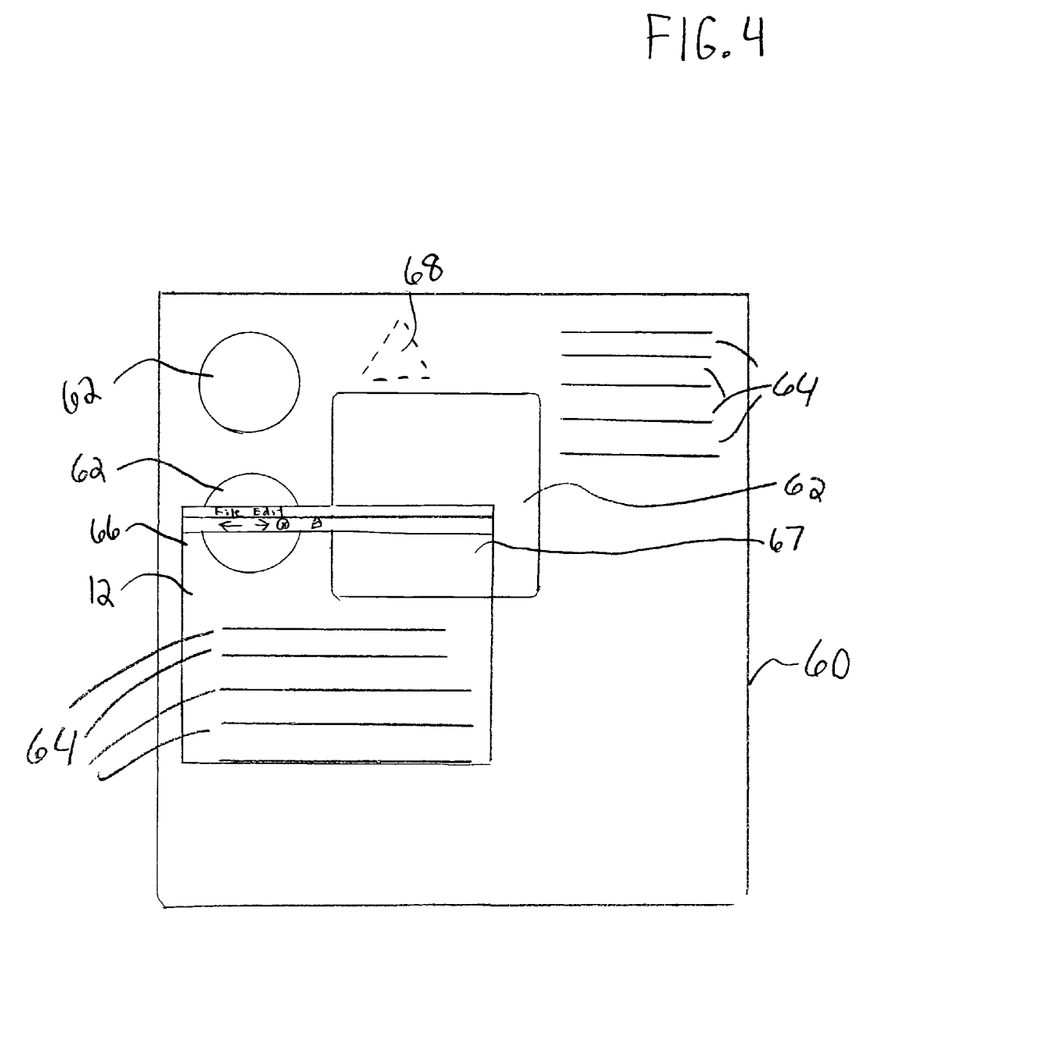
FIG. 4 is a representation of a display for a mobile telephone superimposed on a larger Internet web page, showing how the entire web page is not visible at a single time on the display.

FIG. 4 is a representation showing a typical Internet 28 web page 60 in combination with a display 32 superimposed thereon. The web page 60 can include graphics 62, text 64, and other objects. As can clearly be observed, the entire web page 60 cannot be viewed on the display 32 at one time. Current browsers typically maintain the viewed location on a web page based upon the distance from the upper left corner of the page.

According to the present invention, a point on the display 32 is used as the point of reference during the process of loading content onto the electronic device. For example, the point of reference for the setup shown in FIG. 4 can comprise the portion of the web page 60 that is shown in the upper left corner 66 of the display 12. In the event that a new object 68 or a new portion of the web page 60 is downloaded to the electronic device above a portion of the web page 60 visible in the display 32, the portion of the web page 60 that can be seen in the display 32 is not affected. In prior art systems, the reference point would typically comprise a specific corner of the web page 60, regardless of where the page was positioned on the display 32. In such a prior art instance, if the new object 68 were downloaded while the display 32 showed the content depicted in FIG. 4, the display 32 would "jump" in order to compensate for the change in size or shape of the web page 60 as a result of the new object 68.

In the event that the new object 68 or a new portion of the web page 60 is positioned such that it would appear somewhere within the web page 60 that is shown in the display 32, the viewed portion of the web page 60 on the display 32 would change. However, such a change within the display 32 would be expected by the user, and any potential "jumping" effect would be modest in comparison to the jump that would otherwise occur with a new object 68 that appears above and/or before the viewed portion of the web page 60. Furthermore, this particular situation would be relatively rare compared to the occurrences of new content appearing above the viewed portion of the web page 60.

As mentioned above, the upper left corner 66 of the web page 60 portion appearing on the display 32 can be used as the reference point for the implementation of the present invention. This location may be particularly beneficial when either the web page 60 at issue or the user utilizes a Germanic language, such as English, Spanish, French, German or Italian, where text is read from left to right. In such a situation, a user will typically begin scrolling through the web page 60 from the upper left corner 66 of the web page 60. However, where the user's language or the language used on the web page 60 is read from right to left, such as Hebrew and Arabic, it may instead be desirable to use the upper right corner 67 of the content appearing on the display 32 as the reference point. Additionally, any other point besides the upper right and left corners, such as a center point or the middle of the upper edge, or in some cases even the lower left or right corners, or the middle of the lower edge, may be used as well. The use of other points may be particularly advantageous when viewing documents other than web pages. The reference point may be a user-definable setting, it may be defined by the author of the displayed web page or document, or it may be a default setting in the device.

In terms of the present invention, it should also be noted that the arrival of images is not the only activity that may cause the layout of the web page 60 to change. For example, in order to make the downloaded content visible more quickly, many web browsers begin rendering the content before they have received the entire marked up document. This forces the browser to estimate the final layout, which causes the mark-up to arrive later (for instance, the content of cells in a table), altering the final layout of the web page 60. Another example of a situation where the present invention may be utilized involves the use of scripting such as JavaScript and ECMAScript. Because a script can modify, add, or remove content, it can cause changes to the layout at virtually any moment. Yet another situation where the present invention can be used involves the use of external style sheets (CSS) with web pages. If a style sheet arrives after the page rendering begins and contains, for example, size and/or position definitions for objects appearing on the page, a change in page layout can also occur. The present invention can apply to all of these situations and others.

Figure 5:
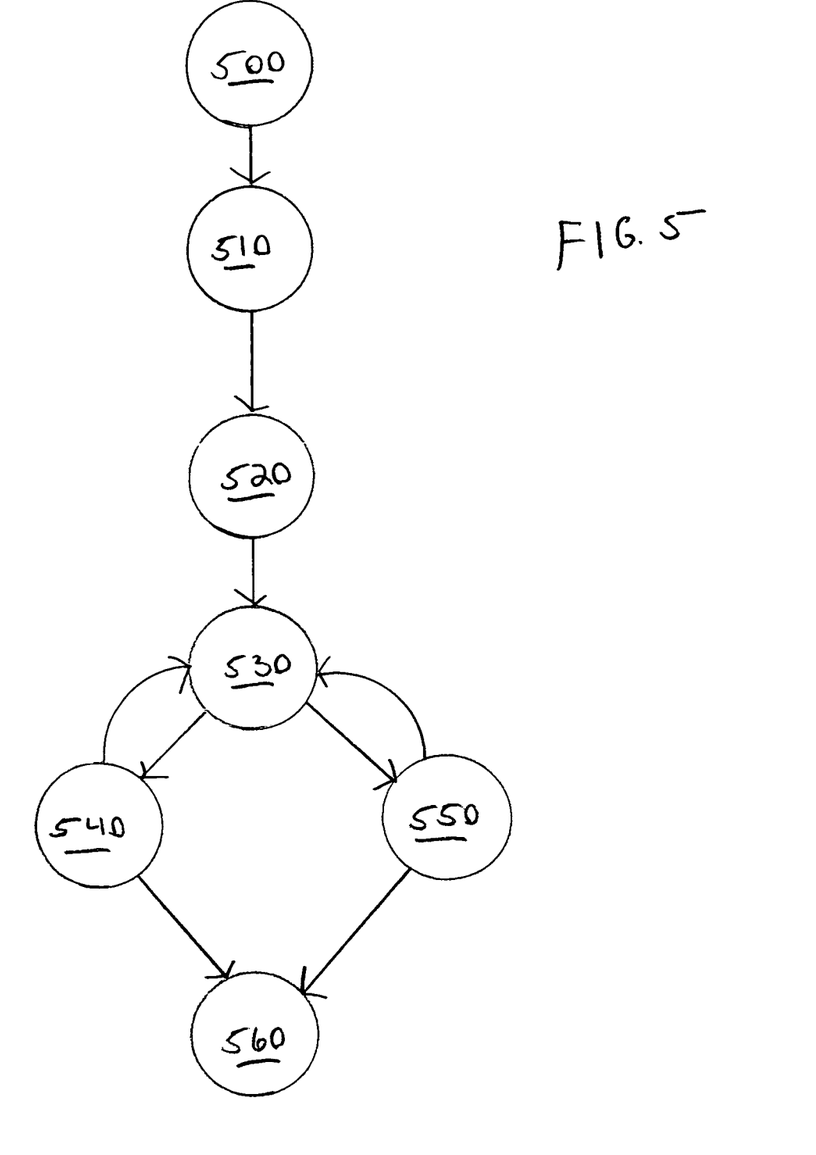
FIG. 5 is a flow chart showing a process for implementing one embodiment of the present invention.

FIG. 5 is a flow chart showing the implementation of one particular embodiment of the present invention. At step 500, a user directs his web browser to a web site. At step 510, the first portion of the web page 60 at the web site is transferred to user's electronic device and begins to appear on the display 32 of the electronic device. At step 520, the user scrolls through a portion of the web page 60 as it then appears on the display 32 and begins viewing content. At step 530, a reference point is selected by the electronic device based upon a portion of the web page 60 that appears within the display 32. At step 530, an additional portion or a second portion of the web page 60 is downloaded to the electronic device. At step 540, if the additional material is positioned on the web page 60 above or before the reference point or the currently displayed portion of the page, and therefore would not be positioned within the display 32 at that given moment, then the web page 60 continues to load without any adjustment of the portion of the web page 60 appearing on the display 32. If, on the other hand, the new material is to be positioned on the web page 60 below or after the reference point or the upper first portion of the displayed portion of the page, then at step 550 the portion of the web page 60 appearing on the display 32 is adjusted as necessary to incorporate the new material. By "upper first portion," it is meant the region of the page where a user would normally begin reading. For many languages, this is the upper left hand corner, while it is the upper right hand corner for other languages. Steps 530-550 continue to take place until the entire web page 60 has been downloaded, which is represented at step 560. As mentioned previously, it is also possible for a document to be locally stored in the system memory. In this case, as the document is being exhibited, the individual portions of the document are received from the memory instead of a remote source.

It should be noted that references to a "first portion" and a "second portion" do not require that the downloading or rendering of material be performed in a certain number of steps. For example, in situations where there a complex web page 60 is being downloaded over a slow modem connection, it is possible that dozens of steps may be involved in obtaining the entire document.

It should also be noted that the present invention may be implemented for displaying both two-dimensional and three-dimensional content. In the case of three-dimensional content, the same functions that are applied in relation to the x and y-axes can also be applied in relation to the z-axis.

The present invention is described in the general context of method steps, which may be implemented in one embodiment by a program product including computer-executable instructions, such as program code, executed by computers in networked environments.

Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule-based logic and other logic to accomplish the various database searching steps, correlation steps, comparison steps and decision steps. It should also be noted that the words "component" and "module" as used herein, and in the claims, is intended to encompass implementations using one or more lines of software code, and/or hardware implementations, and/or equipment for receiving manual inputs.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A method comprising:
   downloading a first portion of a web document;
   directing exhibiting of the first portion on a display;
   selecting a reference point having a predefined location on the display, wherein the reference point corresponds to a portion of the web document appearing in a region selected from a group consisting of an upper right hand corner of the display, a middle portion of an upper edge of the display, and a center of the display with the selection being based upon a language in which the web document is presented;
   downloading a second portion of the web document; and
   in an instance the second portion is positioned so as to be exhibited on the display above the reference point, substantially maintaining a position of the first portion exhibited on the display during and throughout completion of the downloading of the second portion of the web document.

2. The method of claim 1, wherein the web document comprises a web page.

3. The method of claim 1, further comprising, if a third portion of the web document is to be positioned after the reference point, and if the third portion of the web document is to be positioned on the part of the web document appearing on the display, directing exhibiting of at least a part of the third portion on the display.

4. The method of claim 1, further comprising, before receiving the second portion of the web document, at least partially scrolling through the first portion of the web document.

5. The method of claim 1, wherein the reference point corresponds to the portion of the web document appearing in the region selected from the group further consisting of the upper left hand corner of the display.

6. A computer program product comprising a non-transitory computer-readable medium having computer code stored thereon, the computer code comprising:
   computer code for downloading a first portion of a web document;
   computer code for directing exhibiting of the first portion on the display;
   computer code for selecting a reference point having a predefined location on the display, wherein the reference point corresponds to a portion of the web document appearing in a region selected from a group consisting of an upper right hand corner of the display, a middle portion of an upper edge of the display, and a center of the display with the selection being based upon a language in which the web document is presented;
   computer code for downloading a second portion of the web document; and
   in an instance the second portion is positioned so as to be exhibited on the display above the reference point, computer code for substantially maintaining a position of the first portion exhibited on the display during and throughout completion of the downloading of the second portion of the web document.

7. The computer program product of claim 6, wherein the web document comprises a web page.

8. The computer program product of claim 6, further comprising computer code for, if a third portion of the web document is to be positioned after the reference point, and if the third portion of the web document is to be positioned on the part of the web document appearing on the display, directing exhibiting of at least a part of the third portion on the display.

9. The computer program product of claim 6, further comprising computer code for, before receiving the second portion of the web document, at least partially scrolling through the first portion of the web document.

10. The computer program product of claim 6, wherein the reference point corresponds to the portion of the web document appearing in the region selected from the group further consisting of the upper left hand corner of the display.

11. An apparatus comprising at least one processor and at least one memory including computer program code, the at least one memory and the computer program code configured to, with the at least one processor, cause the apparatus at least to perform:
   downloading a first portion of a web document;
   directing exhibiting of the first portion on the display;
   selecting a reference point having a predefined location on the display, wherein the reference point corresponds to a portion of the web document appearing in a region selected from a group consisting of an upper right hand corner of the display, a middle portion of an upper edge of the display, and a center of the display with the selection being based upon a language in which the web document is presented;
   downloading a second portion of the web document; and
   in an instance the second portion is positioned so as to be exhibited on the display above the reference point, substantially maintaining a position of the first portion exhibited on the display during and throughout completion of the downloading of the second portion of the web document.

12. The apparatus of claim 11, wherein the web document comprises a web page.

13. The apparatus of claim 11, wherein the reference point corresponds to the portion of the web document appearing in the region selected from the group further consisting of the upper left hand corner of the display.

14. The apparatus of claim 11, wherein the apparatus is further caused to perform, if a third portion of the web document is to be positioned after the reference point, and if the third portion of the web document is to be positioned on the part of the web document appearing on the display, directing exhibiting of at least a part of the third portion on the display.

15. The apparatus of claim 11, wherein the apparatus is further caused to perform at least partially scrolling through the first portion of the web document before receiving the second portion of the web document.

16. The apparatus of claim 11, wherein the electronic device comprises a device selected from the group consisting of a mobile telephone, a personal digital assistant, a personal computer, an integrated messaging device, and combinations thereof.

17. The method of claim 1, wherein positioning the second portion includes positioning the second portion such that at least part of the second portion is not exhibited on the display.

18. The computer program product of claim 6, wherein the computer code for positioning the second portion includes computer code for positioning the second portion such that at least part of the second portion is not exhibited on the display.

19. The apparatus of claim 11, wherein the apparatus caused to position the second portion includes being caused to position the second portion such that at least part of the second portion is not exhibited on the display.

* * * * *